(12) United States Patent
Li et al.

(10) Patent No.: US 8,610,730 B1
(45) Date of Patent: Dec. 17, 2013

(54) SYSTEMS AND METHODS FOR TRANSFERRING IMAGES AND INFORMATION FROM A MOBILE COMPUTING DEVICE TO A COMPUTER MONITOR FOR DISPLAY

(71) Applicant: Google, Inc., Mountain View, CA (US)

(72) Inventors: Yang Li, Palo Alto, CA (US); Matei Negulescu, Waterloo (CA)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/622,467

(22) Filed: Sep. 19, 2012

(51) Int. Cl.
*G06F 13/14* (2006.01)
(52) U.S. Cl.
USPC .......................................... 345/520
(58) Field of Classification Search
USPC ........................................ 345/2.3, 3.1, 520
See application file for complete search history.

(56) References Cited

U.S. PATENT DOCUMENTS

| | | | | |
|---|---|---|---|---|
| 7,797,430 | B2* | 9/2010 | Ichieda | 709/227 |
| 8,279,258 | B2* | 10/2012 | Ichieda | 348/14.08 |
| 2008/0305813 | A1 | 12/2008 | Rao | |
| 2012/0291073 | A1* | 11/2012 | Friedman | 725/62 |

OTHER PUBLICATIONS

Izadi, S., Brignull, H., Rodden, T., Rogers, Y., and Underwood, M. Dynamo: a public interactive surface supporting the cooperative sharing and exchange of media. Proceedings of the 16th annual ACM symposium on User interface software and technology, ACM (2003), 159-168.

Wigdor, D., Jiang, H., Forlines, C., Borkin, M., and Shen, C. WeSpace: the design development and deployment of a walk-up and share multi-surface visual collaboration system. Proceedings of the 27th international conference on Human factors in computing systems, ACM (2009), 1237-1246.

Tan, D.S., Meyers, B., and Czerwinski, M. WinCuts: manipulating arbitrary window regions for more effective use of screen space. CHI '04 extended abstracts on Human factors in computing systems, ACM (2004), 1525-1528.

Greaves, A. and Rukzio, E. View share: supporting co-present viewing and sharing of media using personal projection. Proceedings of the 11th International Conference on Human-Computer Interaction with Mobile Devices and Services, ACM (2009), 44:1-44:4.

Wallace, G. and Li, K. Virtually shared displays and user input devices. 2007 USENIX Annual Technical Conference on Proceedings of the USENIX Annual Technical Conference, USENIX Association (2007), 31:1-31:6.

Baur, et al, Virtual Projection: Exploring Optical Projection as a Metaphor for Multi-Device Interaction, ACM in the proceedings of CHI 2012, Austin, TX, USA.

* cited by examiner

*Primary Examiner* — Hau Nguyen
(74) *Attorney, Agent, or Firm* — Troutman Sanders LLP; James E. Schutz; Mark L. Jones

(57) ABSTRACT

Certain implementations of the disclosed technology may include systems, methods, and computer-readable media for transferring images and information from a mobile computing device to a computer monitor for display. In one example implementation, a method is provided that includes receiving, from a remote client, an initiation request, wherein the remote client is associated with a remote display. The method further includes sending a representation of a unique code to the remote client, and receiving, from a mobile device, an indication that the mobile device captured the representation of the unique code. The method further includes receiving, from the mobile device, a display image for presentation on the remote display, and sending the display image to the remote client for presentation on the remote display.

20 Claims, 7 Drawing Sheets

SYSTEMS AND METHODS FOR TRANSFERRING IMAGES AND INFORMATION FROM A MOBILE COMPUTING DEVICE TO A COMPUTER MONITOR FOR DISPLAY

TECHNICAL FIELD

This application generally relates to mobile device computing, and in particular, to transferring images and information from a mobile computing device to a remote computer monitor for display.

BACKGROUND

Mobile computing devices, such as cellular phones, smart phones and tablets, typically have display screens that are relatively small compared to desktop monitors. For example, a typical smart phone may have a touch screen with about 6 square inches of viewing surface, compared to about 175 square inches for a typical 19 inch (diagonal) monitor. The limited viewing space on a mobile device's display screen can sometimes make it difficult to see small details on the graphical user interface (GUI), or to review photos and share screen information with others.

Handheld light projection-based projection devices have shown promise in enlarging the output area of a mobile application, particularly because they offer the advantage of being able to leverage nearly any physical surface for output projection. However, handheld light projection-based interaction presents several issues for mobile users. For example, since few mobile phones are currently equipped with an embedded projector, the projection-based interaction may require additional hardware, such as a dedicated light projector. Furthermore, in order for a user to interact with a projected user interface (for example, to select items, or provide input via the projected user interface), additional sensors (e.g., a depth camera) may be required for detecting user input in the physical space. Another issue associated with a physical handheld light projector is that a user may encounter significant problems with image stability and/or user fatigue while holding the projector, and a mounting or stabilizing platform may be necessary for holding the projector in a stationary position to project a stationary image.

SUMMARY

Certain implementations of the disclosed technology may include systems and methods for transferring images and information from a mobile computing device to a computer monitor for display.

According to an example implementation, a method is provided. In one example implementation, a method is provided that includes receiving, from a remote client, an initiation request, wherein the remote client is associated with a remote display. The method further includes sending a representation of a unique code to the remote client, and receiving, from a mobile device, an indication that the mobile device captured the representation of the unique code. The method further includes receiving, from the mobile device, a display image for presentation on the remote display, and sending the display image to the remote client for presentation on the remote display.

According to an example implementation, another method is provided. The method includes receiving, at a mobile device, a representation of a unique code, wherein the unique code is associated with a remote display. The method includes sending a request to the server address to initiate communications with the remote display, receiving one or more acknowledgement representations in response to the request, and sending, based at least in part on the received one or more acknowledgement representations, a display image for presentation on a remote display.

According to another example implementation, a system is provided. The system includes at least one memory for storing data and computer-executable instructions, and at least one processor configured to access the at least one memory and further configured to execute the computer-executable instructions to receive, from a remote client, an initiation request, wherein the remote client is associated with a remote display, send a representation of a unique code to the remote client, receive, from a mobile device, an indication that the mobile device captured the representation of the unique code, receive, from the mobile device, a display image for presentation on the remote display, and send the display image to the remote client for presentation on the remote display.

According to example implementations, computer-readable medium is provided that stores non-transitory instructions executable by one or more processors to perform a method that includes receiving, from a remote client, an initiation request, wherein the remote client is associated with a remote display. The method further includes sending a representation of a unique code to the remote client, and receiving, from a mobile device, an indication that the mobile device captured the representation of the unique code. The method further includes receiving, from the mobile device, a display image for presentation on the remote display, and sending the display image to the remote client for presentation on the remote display.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
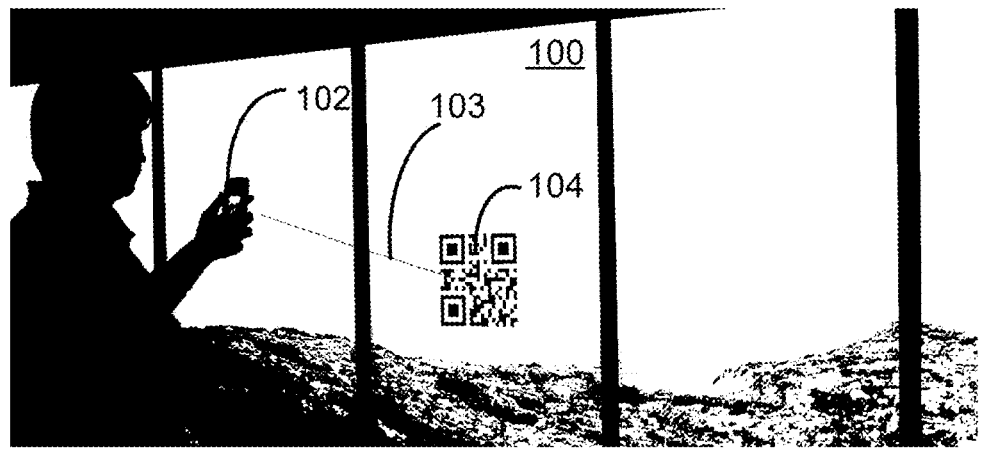
FIG. 1 depicts an initiation process for transferring images and information from a mobile computing device to a computer monitor for display according to an example implementation.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Certain implementations of the disclosed technology may enable the utilization of a remote computer's display monitor (hereinafter "remote display") for presenting information and/or images that initially reside on a mobile computing device. According to certain example implementations of the disclosed technology, the remote display may be utilized to define any display monitor controlled by a computer connected, for example, to the Internet. In certain example implementations, the remote display may be physically adjacent to and/or visible to a user. Example implementations of the disclosed technology provide a tool that may allow a user to leverage the large interaction space of the remote display, which may range in size from a from a PC monitor to a wall-size display. Example implementations of the technology may be utilized in a number of settings ranging from private viewing on one's computer monitor to public viewing on a monitor wall.

According to certain example implementations, a "remote projection" metaphor is utilized herein to describe the technology, although the technology does not involve the physical projection of photons from the mobile device to the remote display surface. Example embodiments are different from prior projection-based work in that no real projector device is required.

Certain example embodiments of the disclosed technology may allow a user to "project" and easily share a running native mobile application at a specific position and size on a target remote display, while leveraging the projection metaphor for enabling a larger interaction space for mobile applications. According to an example embodiment, a target remote display may be utilized for input and output while image rendering and other computations may be performed by the mobile device. Certain example embodiments of the technology may achieve the projection effect, in part, by using the built-in camera that is available in most modern smart phones, and will be described in detail below with the aid of the accompanying figures.

FIG. 1 depicts an initiation process for transferring images and information from a mobile computing device 102 to a remote display 100 for presentation, according to an example implementation. According to an example embodiment of the disclosed technology, a user may utilize an available internet-connected computer remote display 100 for transferring content and images from the mobile computing device 102 for viewing on the remote display 100. In one example implementation, the process may begin by launching a web browser on the remote display 100 and opening a particular webpage in the browser. In an example implementation, the particular webpage, once opened, may present a code or code-embedded graphic on the remote display 100, where the code-embedded graphic may include particular information that uniquely identifies a remote display browser for initiating the mobile computing device 102-to-remote display 100 sharing process.

According to other example implementations, the mobile computing device 102-to-remote display 100 sharing process may be initiated by other various methods, including but not limited to near field communications (NFC), Bluetooth communications, radio frequency identification (RFID), and/or location services such as global positioning service (GPS). For example, a remote display 100 may be associated with an internet-connected computer, which may identify information about its capabilities, its location, associated servers, etc., by the various methods discussed above. In certain example implementations, such information may be received and utilized by a mobile computing device to initiate the sharing process.

In one example implementation, to project a mobile application on the remote display 100, a user may utilize a camera on the mobile computing device 102, and the camera may be aimed 103 at the code-embedded graphic on the remote display. In one example implementation, the code or code-embedded graphic may be presented as a 2-dimensional barcode, such as a quick response (QR) code 104. Other information-embedded graphics, images, or text may be utilized without departing from the scope of the disclosed technology. According to an example implementation of the disclosed technology, the mobile computing device 102 may capture the image of the QR code 104 with its camera, and may further decode the embedded information from the QR code 104. In an example implementation, the embedded information may include a link to a particular remote server that is controlling the content in the browser. In an example implementation, the mobile computing device 102 may utilize the link to signify to the server that it is requesting use of the particular remote display 100 for presentation of information from the mobile computing device 102.

According to an example implementation of the disclosed technology, once communications has been established between the remote server and the mobile computing device 102, either via the QR code 104 or by the various NFC methods described above, the mobile computing device 102 may send information to the remote server, which may in turn be utilized for presentation on the remote display 100. In one example implementation, the mobile computing device 102 may send a display image to the remote server for presentation on the remote display 100. According to an example implementation of the disclosed technology, audio information may be sent to the remote server for presentation on a sound system associated with the remote display 100.

According to an example implementation, the display image may be presented on the remote display 100 with certain default settings. For example, in one implementation, the display image may be presented on the remote display in a full-screen mode, with an aspect ratio of the display image preserved. In another example implementation, the orientation of the mobile computing device may be rotated, for example from landscape to portrait and information from the mobile computing device's accelerometer(s) (or other sensors) may be communicated to the remote server for rotating the corresponding image on the remote display 100 from landscape to portrait. Other default presentation settings for the display image on the remote display 100 may be implemented without departing from the scope of the disclosed technology.

Figure 2:
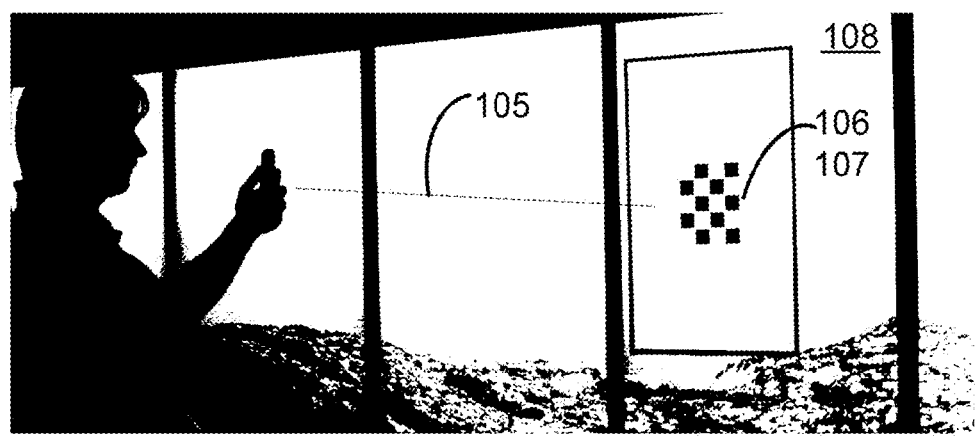
FIG. 2 depicts the mobile computing device positioning the images and information on the computer monitor, according to an example implementation.

According to another example implementation of the disclosed technology, adjustments and/or refinements to the size and positioning of the display image on the remote display 100 may be implemented. For example, once the QR code 104 is identified and processed by the mobile computing device 102 and the remote server, the QR code 104 may be transformed or changed by the remote server to a different pattern, for example, to signify an acknowledgement from the remote server. For example, the identified QR code 104 may change to a checkerboard pattern 106 107, as depicted in FIG. 2. In an example implementation, the checkerboard pattern 106 107 may track or follow the approximate aim 105 of the camera on the mobile computing device 102, and may include shifting or titling as if the pattern were projected from the camera on the mobile computing device 102. FIG. 2 depicts moving the displayed image position from an initial position corresponding to the initial aim 103 of the camera to the desired position at another location 108 of the remote display 100 that corresponds to a new aim 105 of the camera.

Figure 3:
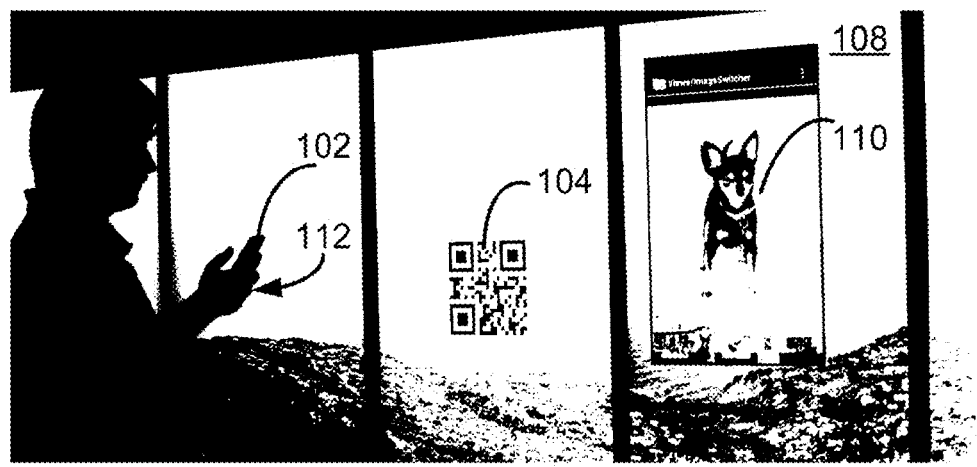
FIG. 3 depicts transferring images and information from the mobile computing device to the computer monitor for display according to an example implementation.

As depicted in FIG. 3, once satisfied with a location, and according to an example implementation, the user may affix the projection at the location 108, for example, by tapping the touch screen associated with the mobile computing device 102, or by providing some other gestures to signify the locking of the desire to lock the image position. Once affixed, the image on the screen of the mobile computing device may be transmitted to the server, and the server may present the image at the affixed position 108. Thereafter, and according to an example implementation, the position or orientation of the mobile computing device may be irrelevant.

For example, the user may put the mobile computing device away or tilt it to a position 112 for ease of use without further affecting the position 108 of the image 110. According to certain example implementation, users may interact with the mobile application via the mobile computing device 102, or input modalities available on the target remote display, e.g. touch or mouse input. Example implementations of the remote projection may allow multiple applications to be projected and used on the remote display at the same time. For example, as depicted in FIG. 3, once a user "claims" a position 108 on the remote display 100, the QR barcode 104 may reappear to signify that the system is ready to repeat a similar process for displaying images and information from another mobile computing device.

Certain example implementations of the disclosed technology provide several differences as compared with a projection generated by a real projector. For example, with a real projector, a projected image changes its size as the projector moves closer or farther to the projected surface. The dimensions of a projected image also become distorted when projecting onto the surface at an angle due to the so called keystone effect. In contrast, the size of the displayed images, according to the disclosed technology, are invariant from the distance between the mobile computing device 102 and the remote display 100, and the projection region may remain rectangular regardless of the projection angle.

Figure 4:
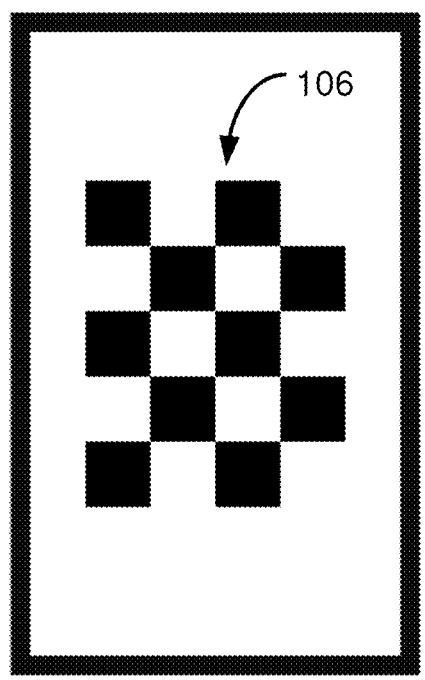
FIG. 4 depicts an acknowledgement/positioning graphic according to an example implementation.
Figure 5:
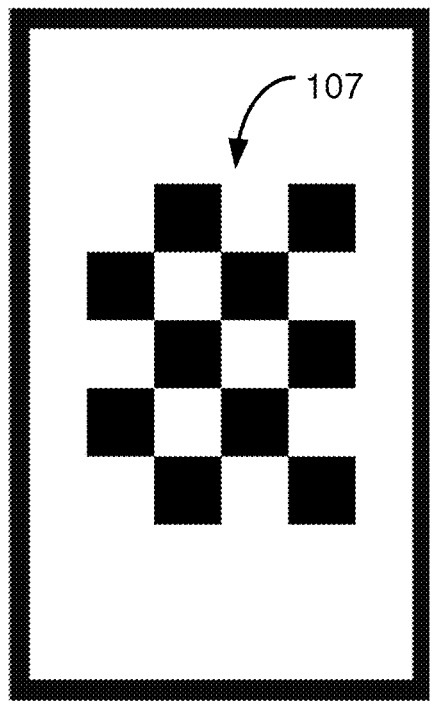
FIG. 5 depicts another acknowledgement/positioning graphic according to an example implementation.

As mentioned above with reference to FIG. 2, an acknowledgement indication may be provided by the remote server when the information (embedded in the QR code, for example) is transmitted by the mobile computing device and received by the server. Such an acknowledgement may take the form of a first 106 pattern as depicted in FIG. 4 and/or a second 107 pattern as shown in FIG. 5, according to an example implementation. The first 106 and second 107 acknowledgement patterns may provide other acknowledgement functions associated with positioning the shared projected graphic according to an example implementation.

According to an example implementation, the first 106 and second 107 acknowledgement patterns may alternate in time. In one example implementation, the alternating period of the first 106 and second 107 acknowledgement patterns may correspond approximately to a latency time associated with round trip time among the camera, the mobile computing device, the internet upload, the server, the internet download, and the computer remote display monitor. In one example implementation, the alternating patterns may provide additional assistance and clues to the user for positioning the image, particularly in situations where asynchronous packet delivery is involved (i.e., when there is no guarantee that payloads sent through the internet will arrive in the same order as they are sent). For example, and according to one embodiment, a user may "drag" the "projected" image position to another part of the remote computer monitor screen by pointing the camera on the mobile computing device at the desired position. In one example implementation, the camera may capture the image, and an application on the mobile computing device may determine a centroid offset of the acknowledgement pattern 116, 117 with respect to the field of view center of the camera. If there is an offset, then the mobile computing device may determine a correction factor that may be sent to the server and utilized to shift the projected image position to a position that coincides with the center of the camera field of view. Since there may be some latency associated with the process, as indicated above, an acknowledgement may be provided by the server via a change in the acknowledgement pattern from the first 106 to the second 107 pattern and back to the first 106 pattern (and so forth) as the image position is updated.

Figure 6:
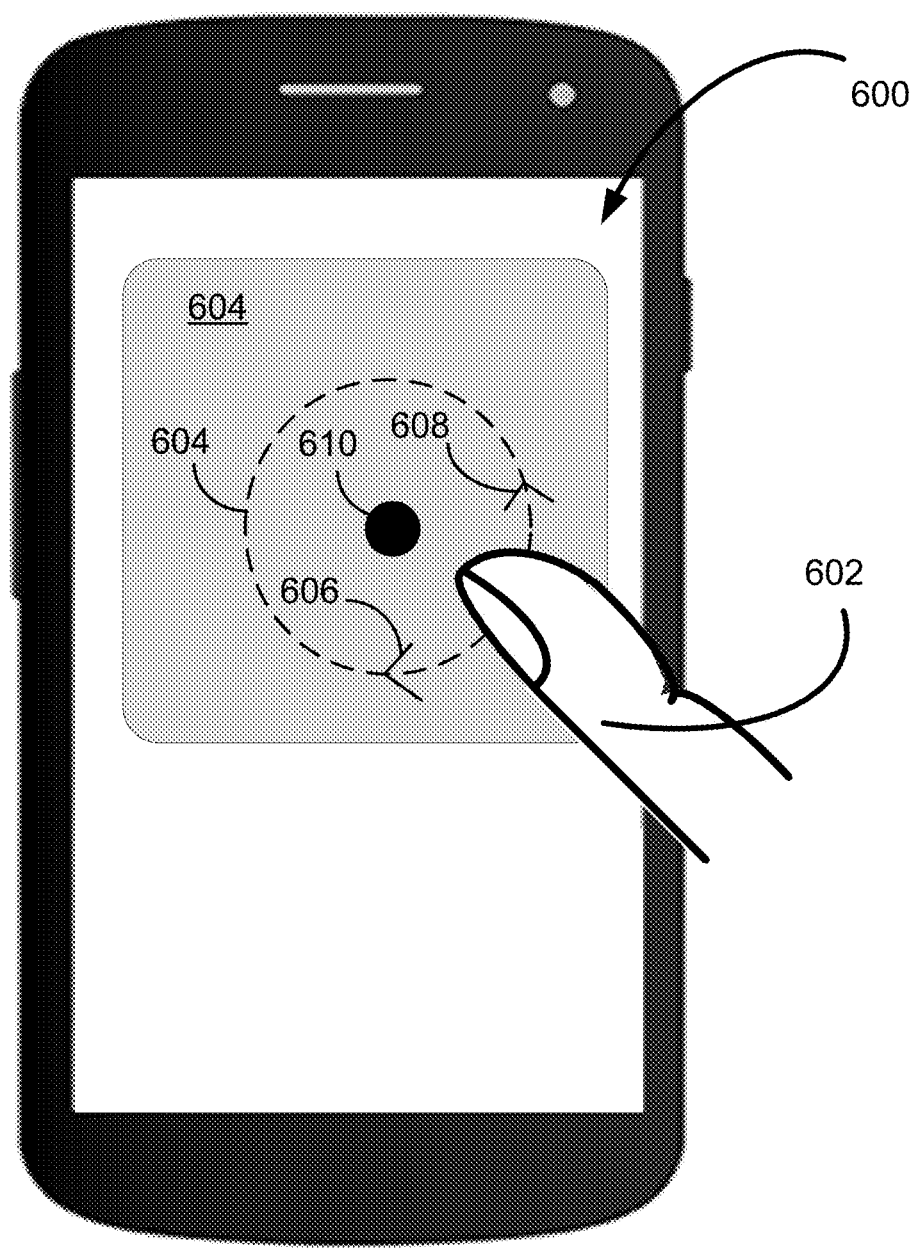
FIG. 6 depicts resizing/fixing the position of images and information on the computer monitor using a mobile computing device, according to an example implementation.

FIG. 6 depicts a mobile computing device (as in the mobile computing device 102 as shown in FIG. 1), where an image 604 to be projected may be resized and/or fixed on the computer monitor (as in the computer remote display monitor 100 as shown in FIG. 1) according to an example implementation. For example, to change the target projection size, according to an example implementation, the user can provided input to the mobile computing device 102 via a gesture 604. For example, in one implementation, re-sizing the projected image may be accomplished by sliding a finger 602 in a circular motion on the touch screen 600, i.e., moving clockwise 606 to enlarge and counterclockwise 608 to shrink the projection region. In one example implementation, the target projected image may be fixed in position and size by tapping 610 on the touch screen 600. Other gestures and user input may be utilized for positioning, tilting, resizing, fixing, etc., without departing from the scope of the disclosed technology.

Figure 7:
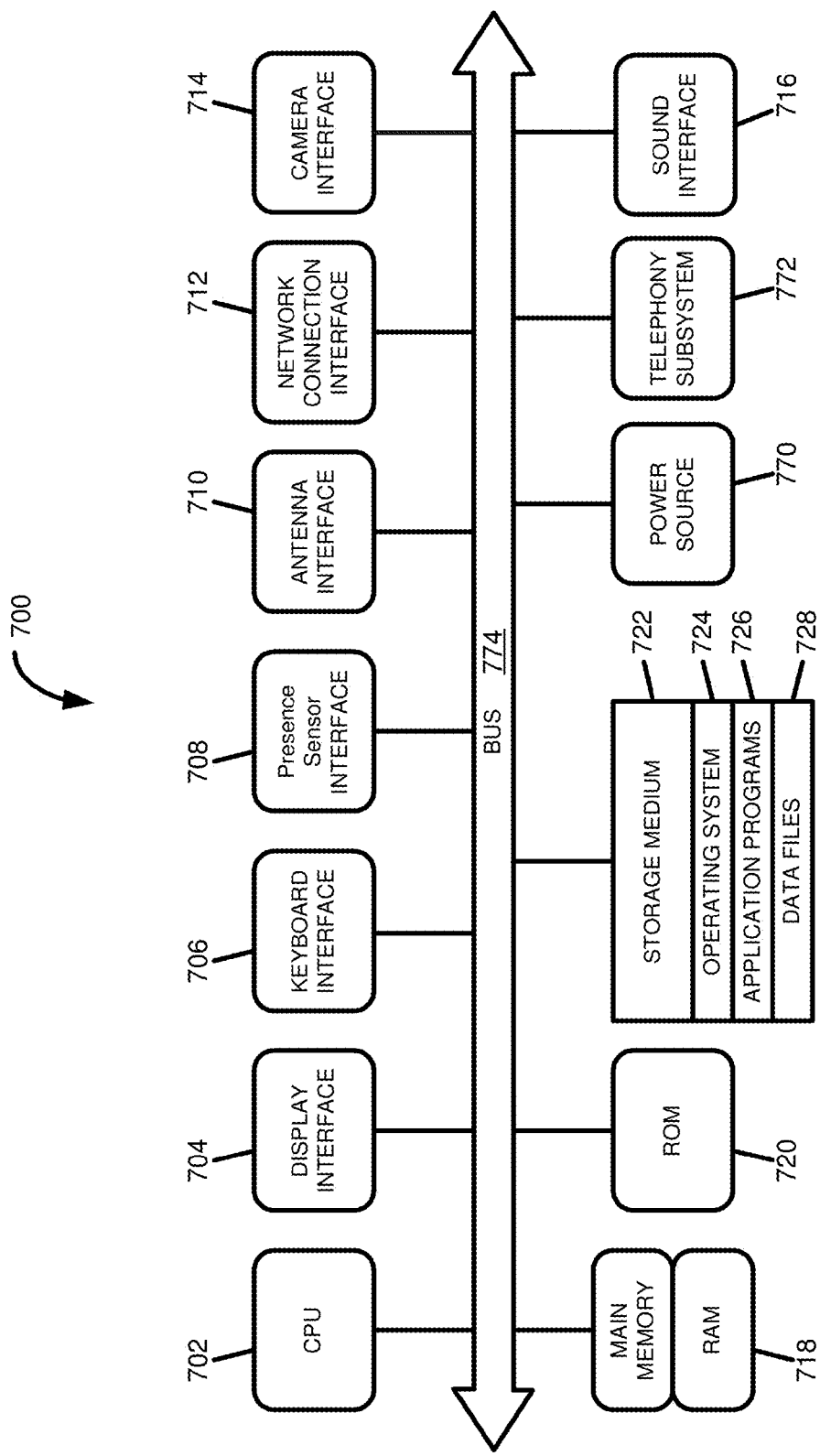
FIG. 7 is a block diagram of an illustrative system architecture, according to an example implementation.

FIG. 7 is a block diagram of an illustrative system architecture, according to an example implementation. Various implementations of the communication systems and methods herein may be embodied in non-transitory computer readable media for execution by a processor. An example implementation may be used in an application of a mobile computing device, such as a smartphone or tablet, but other computing devices may also be represented by FIG. 7, including but not limited to portable computers, tablet PCs, Internet tablets, PDAs, ultra mobile PCs (UMPCs), laptop computers, desktop computers, servers. etc. It will be understood that the architecture illustrated in FIG. 7 is provided for example purposes only and does not limit the scope of the various implementations of the communication systems and methods.

The architecture 700 of FIG. 7 includes a central processing unit (CPU) 702, where computer instructions are processed; a display interface 704 that acts as a communication interface and provides functions for rendering video, graphics, images, and texts on the display; a keyboard interface 706 that provides a communication interface to a keyboard; and a presence sensor interface 708 that provides a communication interface to a pointing device, touch screen, or other presence sensitive detector. Example implementations of the architecture 700 may include an antenna interface 710 that provides a communication interface to an antenna; a network connection interface 712 that provides a communication interface to a network. In certain implementations, a camera interface 714 may be provided that acts as a communication interface and provides functions for capturing digital images from a camera. According to an example implementation of the disclosed technology, the camera interface 714 may be utilized for capturing video sequences for determining gesture based input, for reading QR codes, for capturing acknowledgment patterns, for repositioning an image, and/or for providing interaction with the projected image. In certain implementations, a sound interface 716 may be provided as a communication interface for converting sound into electrical signals using a microphone and for converting electrical signals into sound using a speaker. According to example implementations, a random access memory (RAM) 718 may be provided, where computer instructions and data may be stored in a volatile memory device for processing by the CPU 702.

According to an example implementation, the architecture 700 includes a read-only memory (ROM) 720 where invariant low-level systems code or data for basic system functions such as basic input and output (I/O), startup, or reception of keystrokes from a keyboard may be stored in a non-volatile memory device. According to an example implementation, the architecture 700 includes a storage medium 722 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files may include an operating system 724, application programs 726 (including, for example, a web browser application, a widget or gadget engine, and or other applications, as necessary) and data files 728 may be stored. According to an example implementation, the architecture 700 may include a power source 770 that provides an appropriate alternating current (AC) or direct current (DC) to power components. According to an example implementation, the architecture 700 may include a telephony subsystem 772 that allows the mobile device to transmit and receive sound over a telephone network. The constituent devices and the CPU 702 may communicate with each other over a bus 774.

In accordance with example implementations, the CPU 702 has appropriate structure to be a computer processor. In one arrangement, the computer CPU 702 may be more than one processing unit. The RAM 718 may interface with the computer bus 774 to provide quick RAM storage to the CPU 702 during the execution of software programs such as the operating system application programs, and device drivers. More specifically, the CPU 702 may load computer-executable process steps from the storage medium 722 or other media into a field of the RAM 718 in order to execute software programs. Data may be stored in the RAM 718, where the data may be accessed by the computer CPU 702 during execution. In one example configuration, the architecture 700 may include at least 128 MB of RAM, and 256 MB of flash memory. Other RAM and/or flash memory sizes may be utilized without departing from the scope of the disclosed technology.

The storage medium 722 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media may allow the architecture 700 to access computer-executable process steps, application programs and the like, stored on removable and non-removable memory media, to off-load data from the architecture 700 or to upload data onto the device 700. A computer program product, such as one utilizing a communication system may be tangibly embodied in storage medium 722, which may comprise a machine-readable storage medium.

Figure 8:
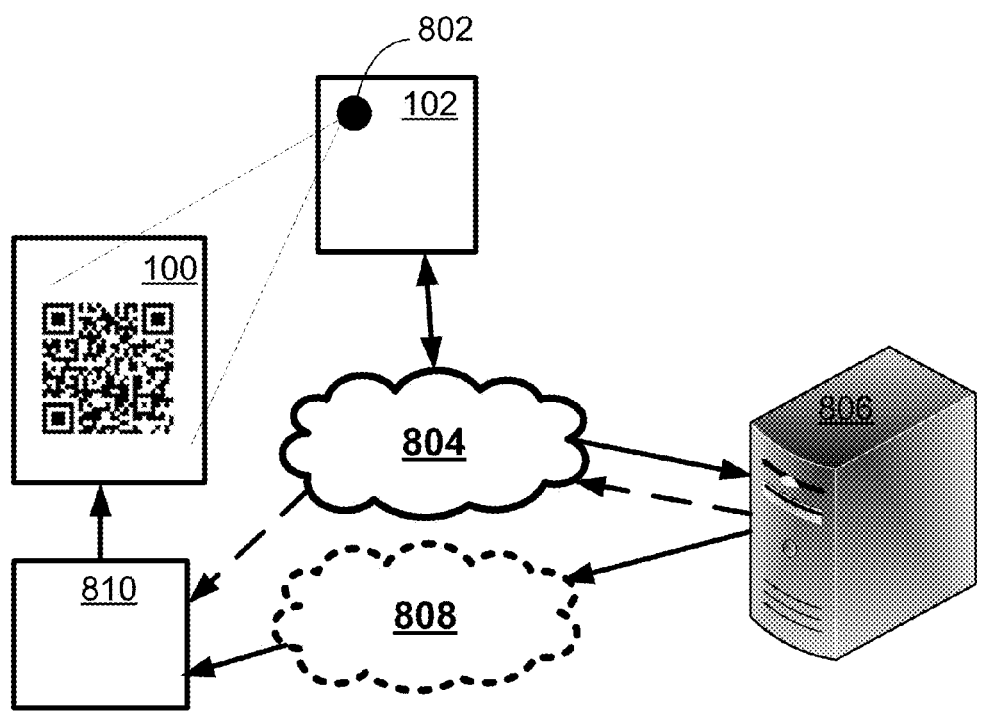
FIG. 8 block diagram a process for communication among the mobile computing device, the server, and the remote computer monitor, according to an example implementation of the disclosed technology.

FIG. 8 block diagram a process for communication among the mobile computing device, the server, and the remote computer monitor, according to an example implementation of the disclosed technology. For example, and according to one implementation, a mobile computing device 102 may include a camera 802, and the camera 802 may be directed to a computer remote display monitor 100. An image (which may be a QR code) may be captured by the camera 802 and decoded by the mobile computing device 102. In other example implementations the information may be presented via NFC, Bluetooth, etc., and captured by associated sensors on the mobile computing device 102. The decoded information may include an address or link to a server 806, which may be accessed via a first communications channel 804 which may include the Wi-Fi, cellular communications, and/or the Internet. In an example implementation, the mobile computing device 102 may provide information to the server 806 based at least in part on the captured image. In an example implementation, the server 806, in response to receiving the information, may provide an acknowledgement to a remote computer 810 via a second communications channel 808. In certain example embodiments, the second communications channel 808 may include certain links, channels etc. that are common with the first communications channel 804. According to an example implementation of the disclosed technology, the remote computer 810, in communication with the remote display monitor 100 may provide image updates for the remote display monitor 100 via a web browser under the direction of the server 805. As previously discussed, once the projected image is fixed, images and information from the mobile computing device 102 may be sent to the remote computer 810 via the server 806 for presentation on the remote computer remote display monitor 100 without further need for interaction with the camera 802.

Figure 9:
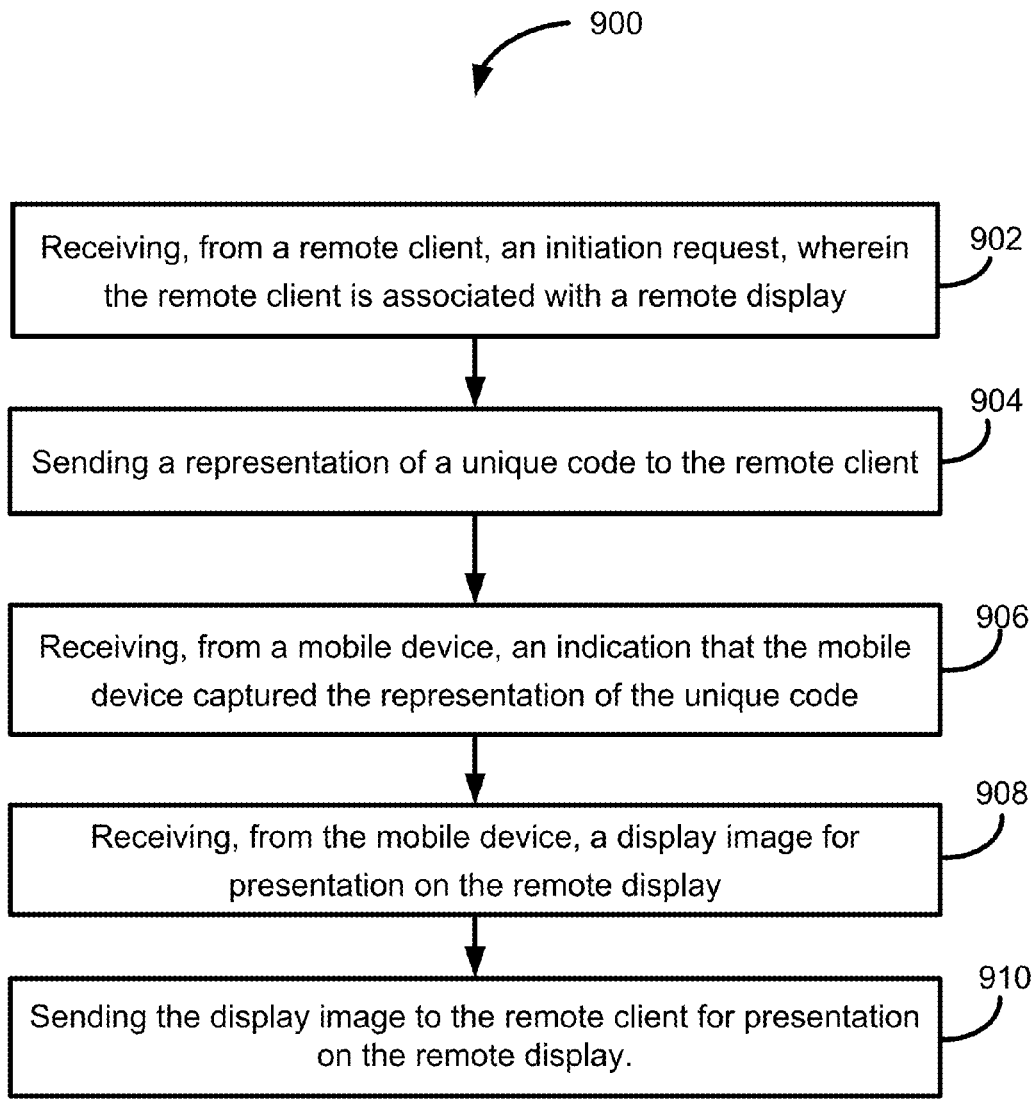
FIG. 9 is a flow diagram of a method according to an example implementation.

An example method 900 for transferring images and information from a mobile computing device to a computer monitor for remote display will now be described with reference to the flowchart of FIG. 9. The method 900 starts in block 902, and according to an example implementation includes receiving, from a remote client, an initiation request, wherein the remote client is associated with a remote display. In block 904, the method 900 includes sending a representation of a unique code to the remote client. In block 906, the method 900 includes receiving, from a mobile device, an indication that the mobile device captured the representation of the unique code. In block 908, the method 900 includes receiving, from the mobile device, a display image for presentation on the remote display. In block 910, the method 900 includes sending the display image to the remote client for presentation on the remote display.

Example implementations may further include generating and sending one or more acknowledgement representations to the remote client, wherein the one or more acknowledgement representations include one or more of positioning and size information for presentation of the one or more display images on the remote display. According to an example implementation of the disclosed technology, positioning and size information may be determined, at least in part, by the mobile device and received from the mobile device. In an example implementation, the representation of the unique code comprises an image. In an example implementation, the image may include a two dimensional (2D) barcode. In an example implementation, the unique code may include a representation of a link to a server address. In an example implementation, the unique code may include an image that is received by a video camera on the mobile device, and wherein the mobile device further decodes the unique code from the transferred image. In an example implementation, the mobile device may control a relative position of the transferred image on the remote display.

Figure 10:
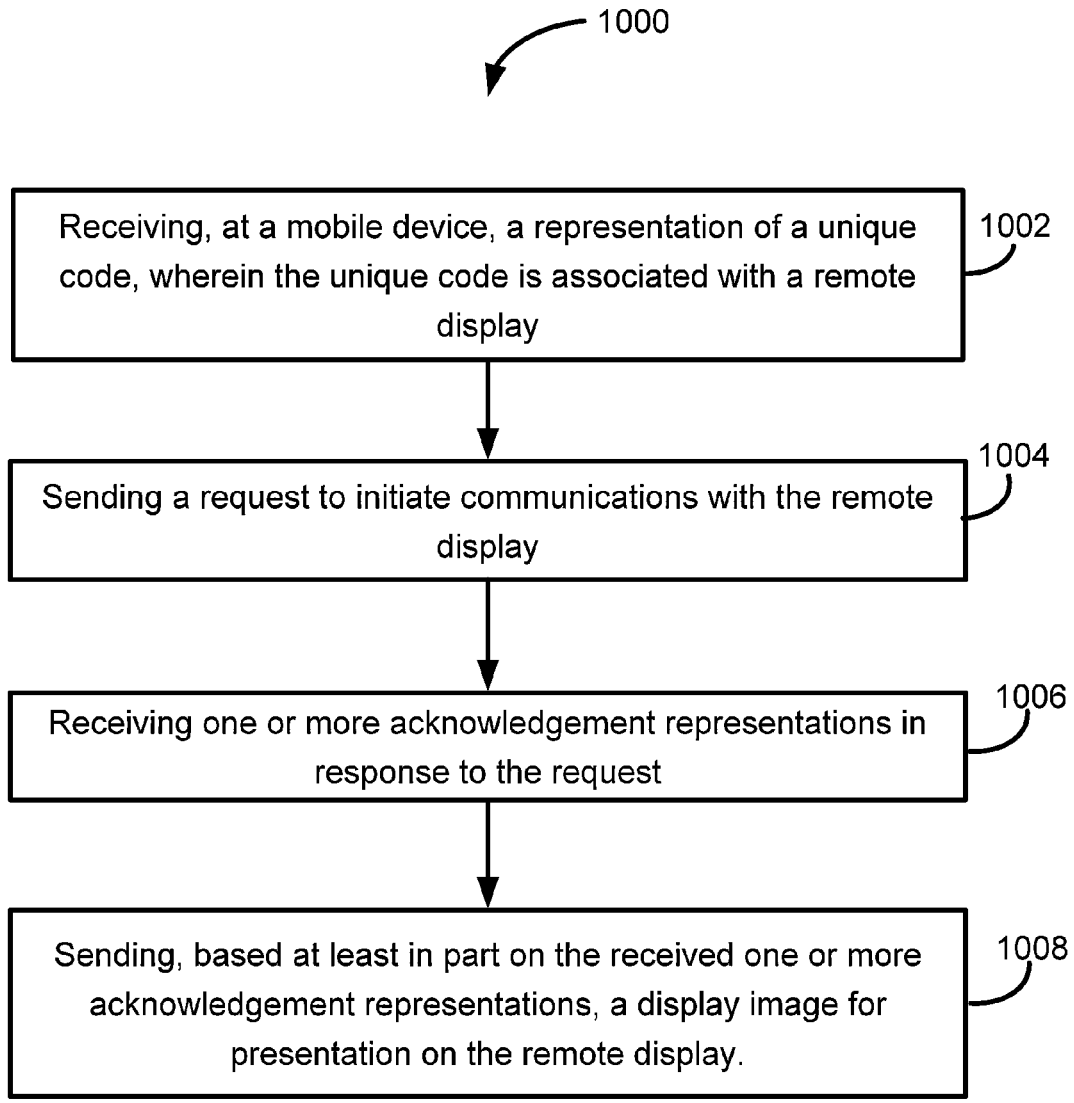
FIG. 10 is a flow diagram of another method according to an example implementation.

An example method 1000 for transferring images and information from a mobile computing device to a computer monitor for remote display will now be described with reference to the flowchart of FIG. 10. The method 1000 starts in block 1002, and according to an example implementation includes receiving, at a mobile device, a representation of a unique code, wherein the unique code is associated with the remote display. In block 1004, the method 1000 includes sending a request to initiate communications with a remote display. In block 1006, the method 1000 includes receiving one or more acknowledgement representations in response to the request. In block 1008, the method 1000 includes sending, based at least in part on the received one or more acknowledgement representations, a display image for presentation on the remote display.

In an example implementation, the representation of the unique code may include an image. In an example implementation, the method may include decoding, by the mobile device, the representation of the unique code to extract the link to the server address from the representation. In an example implementation, the one or more acknowledgement representations may include positioning information for presentation of the one or more images on the remote display. In an example implementation, the positioning information may be determined, at least in part, by the mobile device. In an example implementation, the representation of the unique code may include a two dimensional (2D) barcode that further comprises a representation of a link to a server address. In an example implementation, receiving the representation of the unique code may include receiving an image that is received by a camera on the mobile device, and wherein the mobile device further decodes the unique code from the transferred image.

According to an example implementation of the disclosed technology, once the image has been fixed, users may interact with the projected image through both the application itself running on the mobile computing device and its projection on the remote display. In one example implementation, a user may scroll through the projected pictures by swiping the touch screen on the mobile computing device, with changes taking effect in near real-time in the mirrored remote representation.

In accordance with an example implementation, a third user who wants to have a larger view of an image on their mobile computing device on the same computer monitor may utilize a similar process as described above. For example, capture the QR marker, adjust the projection region, and share the application on the remote computer monitor remote display. Thus, implementation of the disclosed technology may enable hosting multiple projections on a single remote display at the same time.

According to certain example implementations, the runtime architecture of the disclosed system may include of three components: (1) a remote projection service, for example, a web service running on a centralized server for managing projection sessions; (2) a library or application running on the mobile computing device for rendering and sharing images and information with the centralized server; and (3) a web application running in a browser on the computer that hosts the remote display monitor for serving one or multiple projections.

According to an example implementation of the disclosed technology, an arbitrary remote display may become projectable. For example, the owner of the remote display may starts a browser on the remote display's computer and accesses the remote projection service on the web, i.e., via an HTTP request. In one example implementation, a projection display application may be run in the browser. In one example implementation, and as discussed previously, the projection display application may start with a barcode, QR marker, or other graphic shown at the center of the screen that encodes a unique ID for identifying the remote display. Multiple remote displays can request the remote projection service at the same time and each of them may be assigned with a unique ID.

Example implementation of this lightweight deployment can be implmenented by clicking on a bookmark that opens the remote projection web service. The owner of the remote display may also choose to have a background image or a blank screen. For example, on a public remote display in a mall or on the street, a static background image or dynamic graphics (such as ads) can be displayed as usual, and a projection may be rendered on top of the background image(s).

According to certain example implementations, there may be three stages in a remote projection session: (1) identifying a target remote display via the QR marker; (2) adjusting the projection region (its position and size) on the remote display; and (3) and sharing the mobile computing device's screen on the selected display region.

Identifying a Target Remote Display.

In an example implementation, and as described above, the disclosed technology may start by invoking the camera functionality on the mobile computing device to search for a valid QR marker in the scene. In an example implementation, a camera view may be brought to the foreground on the mobile computing device for the user to aim at the QR marker on the target remote display. A QR marker may be detected and decoded to extract the display ID and a request may be sent to the server to create a projection session. In an example implementation, the server may then notify the remote display identified by the decoded display ID with a session ID that denotes the session. Thereafter, communication may be made among the server, the mobile device, and the remote computer (that controls the projection remote display) using the assigned session ID, which may allow messages to be correctly routed when multiple sessions are active. In an example implementation, once the remote computer receives a new session ID, it may responds by turning the QR marker into a checkerboard pattern on the remote display for the user to adjust the projection region.

Adjusting the Projection Region.

Once the checkerboard pattern is detected by the mobile application on the mobile computing device, the mobile application may calculate how much the detected checkerboard deviates from the center of the camera view. The mobile application may send the deviation as the amount of adjustment that the checkerboard pattern has to make on the remote display so that the checkerboard can show up again at the center of the camera view. As the user moves (or tilts) the mobile computing device towards a target position on the remote display, the amount of adjustment needed for the checkerboard pattern may continuously be sent to the remote display, and the position change of the checkerboard on the remote display may be fed back to the mobile computing device through the camera.

As mentioned earlier, a user may slide a finger on the mobile computing device's touch screen in a circular motion to enlarge or shrink a target projection. The bounding box may indicate the target projection size. In an example implementation, the size of the checkerboard may remain constant. In an example implementation, a user may also rotate the mobile computing device to switch between the landscape and the portrait orientation, which may change the orientation of the projection region accordingly.

Once a user taps the mobile computing device's touch screen, the region specified by the blue bounding box may be affixed for projecting the mobile computing device screen. The system may now enter the sharing stage by bringing back the application being projected to the foreground, and showing its QR marker at the center of the remote display once again, for future projections from other mobile devices.

Sharing the Mobile Computing Device Screen.

In this stage, and according to certain example implementations, the mobile computing device's position and orientation may become irrelevant to the projection on the remote display once the image has been affixed, and a user can interact with the application. Meanwhile, the screen image of the application may be polled and in one implementation, an image may be sent to the remote display if the screen has been updated. For example, the remote computer may receive the screenshot of the application, which may be scaled and rendered according to the pre-determined projection region. In certain example implementations, the image sent from the mobile computing device to the remote computer for projection may be compressed to reduce the necessary bandwidth.

In an example implementation, a user may interact with the mobile application on the mobile computing device as usual and the UI changes will be reflected on both the local mobile computing device screen and the remote projection. In addition, the remote projection may allow the user(s) to directly operate the application via the projection, if the remote display supports user input. For example, when a pointing event is detected, such as a mouse or touch event, the remote computer may verify if it is within the boundary of an affixed projection, and if so, may relay the event to the paired projector corresponding to the session ID. This allows remote display to dispatch pointing-related events to appropriate projections when multiple projections exist on the same remote display. On one example implementation, no actions are triggered when a user event falls outside of any projections.

In an example implementation, the mobile application running on the mobile device ma receive input events from its projection on the remote display, and re-dispatch the events to the user interface (UI) of the application that is being projected. In an example implementation, the application may respond to the events as if these events were originated locally from the mobile computing device, and the UI changes will be displayed on the both sides as discussed earlier.

Algorithms for "Camera Projection"

One aspect of the disclosed technology relates to positioning a target projection region on the remote display. This aspect may be useful, particularly for a shared remote display where multiple projections might be placed on the same remote display, and a user needs to find a desired region in the space that is not in use by other existing projections. It is possible for a user to position a projection region using a touchpad-like technique, e.g., sliding finger on the mobile computing device's touch screen to move the projection region on the remote display. However, these techniques may be less intuitive, and may become slow and difficult to use when the traveling distance is large, e.g., on a wall-size remote display. Thus, an alternative is described below.

Returning to the physical handheld light projector metaphor, such a projector allows a user to easily control where a projection should be placed on a large surface by slightly moving and tilting the projector. To mimic this approach, a technique was developed and is disclosed herein that allows a user to physically target their desired location on the remote display, using a built-in mobile computing device camera instead of a real projector.

According to an example implementation of the disclosed technology, a algorithm for simulating the projection behavior with a mobile computing device camera will now be discussed. In one example implementation, a designated pattern on the display (a checkerboard pattern for example), may be positioned by the use of the camera such that it stays at the center of the camera view. When a user moves or tilts the mobile computing device camera towards a new location on the remote display, the target pattern may deviate from the center of the camera view. Based on the amount of observed deviation, a calculation may be made as to how much the target pattern should be moved on the remote display so that it is centered in the camera view again.

Target Pattern Design

One aspect of the disclosed technology is to design an algorithm with an appropriate target pattern that is easy and reliable to detect by a mobile computing device camera. A checkerboard pattern makes for a distinctive marker detectable in many lighting situations and at various angles. In one example implementation, a 5×4 checkerboard patterns (see FIGS. 4 and 5) are utilized and have been found to be resilient for false positives and provide more than enough inner intersection points for calculating the homography matrix. Furthermore, in certain example embodiments, an asymmetric design of the checkerboard is utilized to help determine the orientation of the camera with relation to the remote display, where the checkerboard is displayed.

Detecting a Checkerboard Pattern

According to an example implementation of the disclosed technology, a checkerboard detection algorithm may utilize OpenCV, a popular open source library for computer vision. In a certain example implementation, the algorithm may be utilized to detect a specific checkerboard pattern in a frame by thresholding the image, searching for black quads, and finding and ordering internal intersection points. Example embodiments of the typical algorithm may weight accuracy over speed by continuously iterating the search to find ever expanding quads and attempting new configurations of rectangles. The typical algorithm, however, may be less efficient in cases where continuous real-time tracking is needed on mobile computing device processor. Thus, in one example embodiment, the OpenCV algorithm may be refined in three ways. First, quads may be quickly processed (or eliminated) by aggressively thresholding based on their size and proximity. Second, the iteration of the search by expanding quads to find more intersection points may be eliminated. For example, experiment were carried out and it was determined that iterating the search has diminishing returns that do not justify the time cost. Third, detected checkerboard points may be sorted based on the orientation of the mobile computing device and their order in the horizontal and vertical axis, to make finding homography later more efficiently.

Transforming Deviation from Camera to Display Coordinates

According to an example implementation of the disclosed technology, the output of the checkerboard detection algorithm may be a set of twelve ordered internal intersection points in the camera coordinates. For example, let dx and dy be the offsets of the centroid of these points from the center of the camera view on the horizontal and vertical axis. In an example implementation, these offsets may be transformed to display coordinates to determine how much the checkerboard needs to be moved on the remote display (see Equation (1)).

$$w \begin{bmatrix} dx' \\ dy' \\ 1 \end{bmatrix} = H \begin{bmatrix} dx \\ dy \\ 1 \end{bmatrix}, \quad (1)$$

where H is a 3×3 projective transformation, i.e., a homography matrix, from camera to remote display coordinates. H may be calculated by iteratively finding the best mapping and the transformation matrix between two sets of points (which in our case includes the checkerboard points detected in camera coordinates and on the display). However, this process may be simplified by determining correspondences between sets of points, by sorting the detected checkerboard points based on the mobile computing device orientation (detected via built-in accelerometers) and their order in the horizontal and vertical axis. Once the correspondences are known, we can determine the homography H by calculating the least square solution of a linear system (see Equation 2), which may be faster than an iterative approach $$T = HO, \quad (2)$$

where O may be a 3×12 matrix wherein each column is the homogeneous coordinate of a checkerboard point observed in camera coordinates. In one example implementation, T captures the coordinates of the 12 checkerboard points on the display. In a certain implementation, the absolute position of the checkerboard points on the display may not need to be known due to the following deduction: each point can be represented as a relative coordinate, $T_{relative}$, to the checkerboard center, $T_{center}$, and the same may hold for the observed checkerboard points O. Thus, $$T_{center} + T_{relative} = H(O_{center} + O_{relative}). \quad (3)$$

Because $T_{center} = H \, O_{center}$ and is redundant for the calculation, we acquire Equation 4.

$$T_{relative} = HO_{relative}, \quad (4)$$

where both $T_{relative}$ and $O_{relative}$ are known. However, determining $T_{relative}$ still may require knowing the physical size of the checkerboard on the display although it does not change during projection. In one example implementation, a predetermined fixed checkerboard size may be used for all displays; however, a fixed size may be inappropriate for diverse projection constraints. For example, a large checkerboard may be used for a wall-size display to allow long-range projection while a small checkerboard may be utilized for a PC monitor. In one example implementation, the remote display may pass the checkerboard size being used to the mobile computing device (via the server) at runtime. In an example implementation, we may eliminate this extra communications step by further deduction. For example, and according to an example implementation, the size factor, S, may be factored out of $T_{relative}$:

$$ST_{unit} = HO_{relative} \quad (5)$$

where S may be a 3×3 scaling transformation matrix and $T_{unit}$ is set of checkerboard points on a unit scale, independent of actual physical size and position of the checkerboard. In an example implementation, we may then acquire:

$$T_{unit} = S^{-1} HO_{relative}. \quad (6)$$

In this example implementation, $T_{unit}$ is constant, $O_{relative}$ is known, and $S^{-1} H$ may be calculated as a whole. In an example implementation, the amount of adjustment needed at the unit scale may be calculated based on Equations (1) and (6), i.e., the left side of Equation (7) (below), may be sent to the remote display as a whole:

$$wS^{-1} \begin{bmatrix} dx' \\ dy' \\ 1 \end{bmatrix} = S^{-1} H \begin{bmatrix} dx \\ dy \\ 1 \end{bmatrix}. \quad (7)$$

In an example implementation, because the remote display knows the actual size of the checkerboard, S, it can recover dx' and dy' by scaling up the unit scale adjustment.

Synchronizing by Alternating Checkerboard Patterns.

According to an example implementation of the disclosed technology, generating updates on the mobile computing device and actually updating the checkerboard on the remote display may essentially include two asynchronous but dependent processes. An update, for example, may be relative and applied to the checkerboard's current position, and the updated position may then be used by the mobile computing device for generating next update. As a result, and according to an example implementation, when an update is sent to the remote display over the network, the mobile computing device may need to wait for it to be processed by the remote display before analyzing a new frame and generating another update. This essentially requires the two processes to be synchronized by allowing only one of them to run at a time.

To determine if an update has been processed, i.e., the checkerboard has been moved, the checkerboard's deviation change observed through the camera may not be reliable because the mobile computing device may be in constant motion even when it is not intended by the user. Thus, explicit acknowledgement from the remote display may be needed to indicate an update has been processed. In one example implementation, it is possible for the remote display to send a message the mobile computing device over the network. However, this additional trip not only complicates the protocol but also increases the latency.

In an example implementation of the disclosed technology, a visual synchronization mechanism may be utilized by alternating between two distinct checkerboard patterns (106, 107) that share the same dimension (see FIGS. 4 and 5). For example, when the remote display moves the checkerboard in response to an update request, it flips or alternates the checkerboard pattern to acknowledge visually. Once the mobile computing device detects the switch of the type of checkerboard being shown, it may start to process a new frame and sends a new update. Generating an update only when a checkerboard pattern flips synchronizes the processes well. However, it can be the case that, before an update is processed or even received by the remote display, the mobile computing device is already in a new position or orientation, due to the latency of the system and fast motion of the user hand. To maximally follow the user motion, and according to an example implementation, updates may be constantly generated without waiting for the pattern to switch, but with an important enhancement. According to an example implementation of the disclosed technology, each update may be sent with the type of the pattern from which the update is generated, i.e., either a first 106 or second 107 checkerboard pattern. In an example implementation, when an update reaches the remote display, the remote display may check its pattern type, apply the one that is consistent with the current checkerboard pattern on the remote display and at the same time flips the pattern. This enhancement may ensure that a correct update is used for the current checkerboard position, which is based on the assumption that, in general, an update would take too long, i.e., longer than two pattern switches, to arrive at the display. This approach allows a later update to override an earlier unprocessed update, and leverage the nondeterministic ordering of messages over the network in the sense that a late update can arrive early.

Certain example embodiments of disclosed technology provide an effective, lightweight solution for sharing mobile media. Embodiments of the disclosed technology enable one or more users to quickly identify a display and begin intuitively sharing content without the need for complex authentication. While the prototype system may be limited in performance due to the current state of mobile processing power, Wi-Fi bandwidth, and other factors, the system offers the potential for high performance in dynamic applications such as video sharing or real-time gaming. Certain example implementations of the disclosed technology, for example, may be utilized to take advantage of the hardware in mobile computing devices. For example, a central processing unit or a graphical process unit associated with the mobile computing device may be utilized to perform the checkerboard marker detection. In certain example embodiments, images may be compressed to improve frame rates. Additionally, according to an example implementation, sharing performance may be improved through streaming technology, e.g. efficient encoding and decoding algorithms and optimized transfer protocols such as the Real Time Streaming Protocol.

According to an example implementation, the disclosed technology may be utilized as an impromptu remote desktop protocol. For example, an available remote monitor in the user's environment may be used to ephemerally manipulate native mobile applications. Example implementations of the disclosed technology may provide a lightweight architecture to perform an entire projection workflow. According to an example embodiment, a display that is capable of showing a browser may be utilized for an output device for displaying content from the user's mobile computing device. According to an example implementation, an application (for example, a mobile app) may be downloaded to a mobile computing device to handle the mobile processes associated with the disclosed technology. In another example implementation, the application may be part of (or integrated into) the operating system associated with the mobile computing device.

In example implementations of the disclosed technology, the system architecture 700 and various other system components may include any number of hardware and/or software applications that are executed to facilitate any of the operations. In example implementations, one or more I/O interfaces may facilitate communication between the system architecture 700, the various other system components, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the system architecture 700 and various other system components. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the system architecture 700 and various other system components inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As desired, implementations of the disclosed technology may include the system architecture 700 and various other system components with more or less of the components illustrated in FIG. 7 and/or FIG. 8.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smart phones.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method comprising:
receiving, from a remote client, an initiation request, wherein the remote client is associated with a remote display;
sending a representation of a unique code to the remote client;
receiving, from a mobile device, an indication that the mobile device captured the representation of the unique code;
receiving, from the mobile device, a display image for presentation on the remote display;
sending the display image to the remote client for presentation on the remote display; and
sending one or more acknowledgement representations to the remote client, wherein the one or more acknowledgement representations comprise one or more positioning information patterns for independent and dynamic positioning and presentation of the one or more display images on the remote display.

2. The method of claim 1, wherein the one or more acknowledgement representations further comprise size information for presentation of the one or more display images on the remote display, wherein the size information is determined, at least in part, by the mobile device and received from the mobile device.

3. The method of claim 1 wherein the one or more positioning information patterns are determined, at least in part, by the mobile device and received from the mobile device.

4. The method of claim 1, wherein the representation of the unique code comprises an image for presentation on the remote display.

5. The method of claim 4, wherein the image comprises a two dimensional (2D) barcode that further comprises a representation of a link to a server address.

6. The method of claim 1, wherein the unique code comprises an image that is captured by a camera on the mobile device, and wherein the mobile device further decodes the unique code from the captured image.

7. The method of claim 1, wherein the mobile device further controls a relative position of the display image on the remote display.

8. A system comprising:
at least one memory for storing data and computer-executable instructions; and
at least one processor configured to access the at least one memory and further configured to execute the computer-executable instructions to:
receive, from a remote client, an initiation request, wherein the remote client is associated with a remote display;
send a representation of a unique code to the remote client;
receive, from a mobile device, an indication that the mobile device captured the representation of the unique code;
receive, from the mobile device, a display image for presentation on the remote display;
send the display image to the remote client for presentation on the remote display; and
send one or more acknowledgement representations to the remote client, wherein the one or more acknowledgement representations comprise one or more positioning information patterns for independent and dynamic positioning and presentation of the one or more display images on the remote display.

9. The system of claim 8, wherein the at least one processor is further configured to execute the computer-executable instructions to generate and send one or more acknowledgement representations to the remote client, wherein the one or more acknowledgement representations further comprise size information for presentation of the one or more display images on the remote display.

10. The system of claim 8, wherein the representation of the unique code comprises an image that further includes a representation of a link to a web address.

11. The system of claim 8, wherein the unique code comprises an image that is captured by a camera on the mobile device, and wherein the mobile device further decodes the unique code from the captured image.

12. A computer-implemented method comprising:
    receiving, at a mobile device, a representation of a unique code, wherein the unique code is associated with a remote display;
    sending a request to initiate communications with the remote display;
    receiving one or more acknowledgement representations in response to the request; and
    sending, based at least in part on the received one or more acknowledgement representations, a display image for presentation on the remote display; and
    sending one or more positioning information patterns for independent and dynamic positioning and presentation of the one or more display images on the remote display.

13. The method of claim 12, wherein the representation of the unique code comprises an image that is presented on the remote display.

14. The method of claim 12, further comprising decoding, by the mobile device, the representation of the unique code to extract a link to a server address.

15. The method of claim 12, wherein the one or more acknowledgement representations comprise size information for presentation of the display image on the remote display.

16. The method of claim 12 wherein the one or more positioning information patterns are determined, at least in part, by the mobile device.

17. The method of claim 12, wherein the representation of the unique code comprises a two dimensional (2D) barcode that further comprises a representation of a link to a server address.

18. The method of claim 12, wherein receiving the representation of the unique code comprises receiving an image that is captured by a camera on the mobile device, and wherein the mobile device further decodes the unique code from the captured image.

19. A computer-readable medium that stores non-transitory instructions executable by one or more processors to perform a method comprising:
    receiving, from a remote client, an initiation request, wherein the remote client is associated with a remote display;
    sending a representation of a unique code to the remote client;
    receiving, from a mobile device, an indication that the mobile device captured the representation of the unique code;
    receiving, from the mobile device, a display image for presentation on the remote display;
    sending the display image to the remote client for presentation on the remote display; and
    sending one or more acknowledgement representations to the remote client, wherein the one or more acknowledgement representations comprise one or more positioning information patterns for independent and dynamic positioning and presentation of the one or more display images on the remote display.

20. The computer-readable medium of claim 19, wherein the one or more acknowledgement representations comprise size information for presentation of the display image on the remote display.

* * * * *